March 8, 1966     O. HAALAND     3,238,901
THREE CHANNELLED CLAMPS AND PALLETS CONSTRUCTED THEREWITH
Filed Jan. 27, 1965
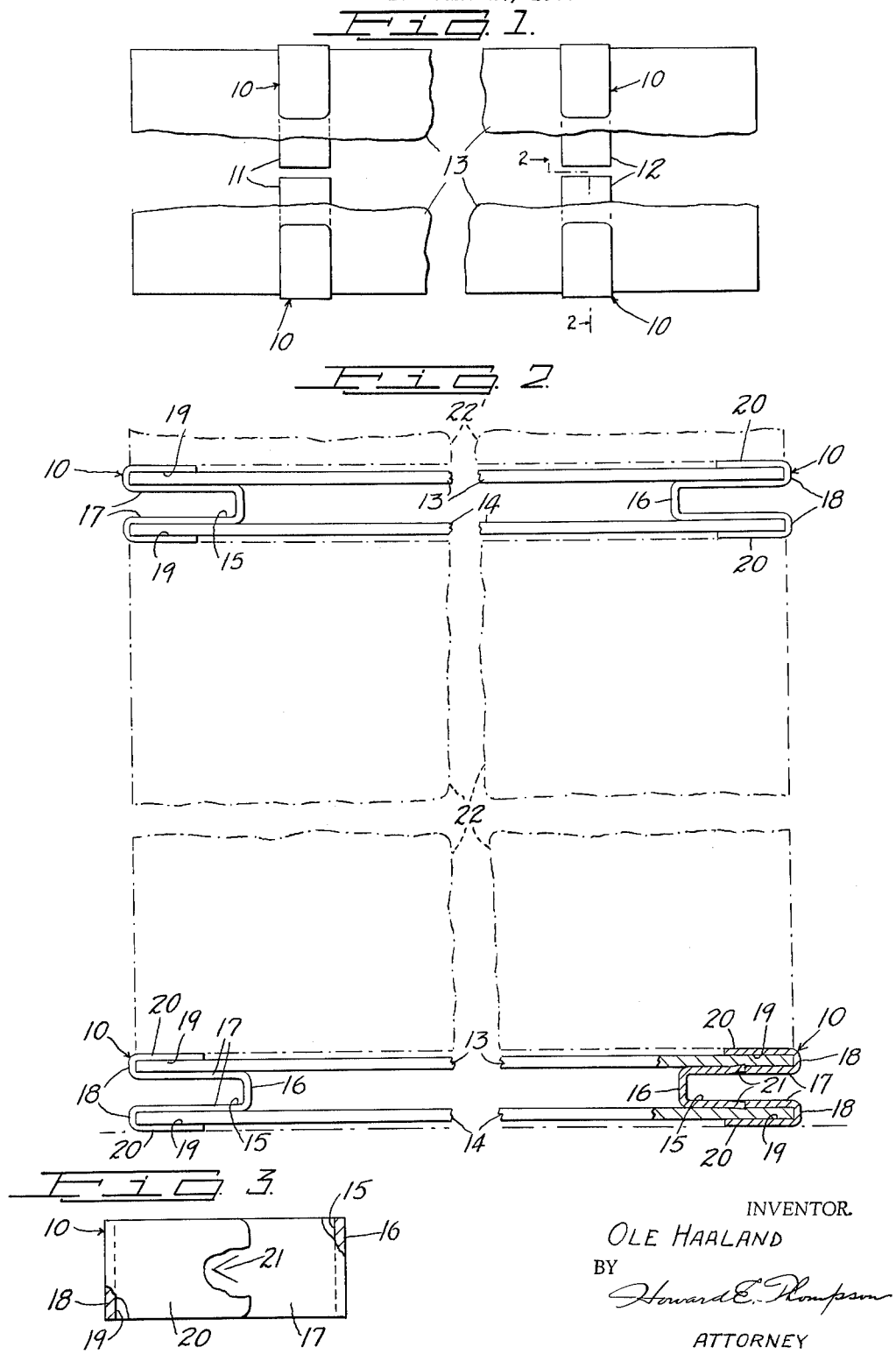
INVENTOR.
OLE HAALAND
BY
Howard E. Thompson
ATTORNEY 3,238,901
THREE CHANNELLED CLAMPS AND PALLETS
CONSTRUCTED THEREWITH
Ole Haaland, Middle Road, Sands Point,
Long Island, N.Y.
Filed Jan. 27, 1965, Ser. No. 428,507
3 Claims. (Cl. 108—57)

This invention relates to pallets used in handling, shipping and storing loads consisting of a product, cases or the like. More particularly, the invention deals in the provision of a simple and economical pallet and one of light weight which will facilitate handling thereof. Still more particularly, the invention deals with a pallet structure comprising a minimum of two pairs of channelled clamps detachable with respect to two plywood or other board in forming a pallet structure of any desired shape or peripheral contour.

Still further, the invention deals in the use of channelled clamps comprising a deep and wide central channel and two shorter, narrower channels opening in a direction opposed to the opening of the deep channel and wherein said deep channel facilitates lifting, tying and otherwise handling and servicing loads arranged on pallets utilizing said channelled clamps.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic plan view of a pallet made according to my invention, with parts of the construction broken away.

FIG. 2 is a side view illustrating two pallets arranged one upon the other, with a section through a part of one pallet generally on the line 2—2 of FIG. 1, loads on the pallets being diagrammatically indicated in dot-dash lines; and FIG. 3 is an enlarged plan view of one of the clamps, with parts of the construction broken away and parts in section.

In diagrammatically illustrating one adaptation and use of my invention, I employ what I term three channelled clamps 10 and, in use, the minimum of two pairs of these clamps such, for example, as the pair 11, shown at the left of FIG. 1, and the pair 12, shown at the right of FIG. 1, are employed in conjunction with two boards, body members or the like 13 and 14. In many uses, these body members can be formed of plywood and, for purposes of description, the members 13 can be considered the upper members and the members 14 can be considered the lower members, as viewed in FIG. 2 of the drawing. These members can be of any contour and, in the illustration of FIG. 1, they are shown as being square or oblong in form. Here, it is to be understood that the pallets can be made to suit any type and kind of load which is to be handled thereby and also in storage of such loads.

The brief description of one of the clamps will apply to all and these clamps comprise a central deep and relatively wide channel 15 having an inner crosshead 16, the side walls 17 of the channel 15 being generally parallel and terminating at their ends in crossheads 18 of shallower and narrower channels 19. The channels 19 are formed partially by the walls 17 and by walls 20, which are shorter in length than the walls 17. The walls 20 are also generally parallel to the walls 17.

In some uses of the clamps, the walls 17 will be fashioned to form V-shaped tangs or grippers 21, shown, in section in FIG. 2, and one of which is illustrated in FIG. 3. These tangs extend slightly into the channels 19 to provide a more permanent engagement of the clamps with the members 13 and 14. Normally, the clamps 10 will have a drive fit on the members 13 and 14 to securely retain them in predetermined fixed positions on the members 13 and 14 so that, in arranging pallets, including their loads, one upon the other for transportation or storage, the clamps will be substantially in common alinement. In assemblage upon the pallets, the clamps will be preferably positioned adjacent ends or sides of the members 13 and 14, as diagrammatically illustrated in FIG. 1 and, where exceptionally long members 13, 14 are employed, it will be understood that additional pairs of clamps can be added to the two pairs of clamps shown at 11 and 12 in FIG. 1 of the drawing.

By employing pallet structures of the type and kind under consideration, a single pallet can be handled by one individual in transporting and storing pallets. In this connection, it will be understood that, in some instances, the clamps can be removed from the members 13, 14 and the members and clamps independently stored.

By employing clamps having the deep central channels, as at 15, opening through sides or ends of the members 13 and 14, these open channels facilitate the engagement of hooks, ropes, cables or the like in picking up several pallets and their loads for collective storage in the holds of ships, onto trucks or other transporting medium and for otherwise storage of the palleted loads.

In the above, reference has been specifically made to the handling of several pallet loads. In some instances, the deep channels 15 can be utilized in tying or binding several pallet loads together. However, individual pallet loads can also be handled, as above described.

The spacing between the members 13, 14 is sufficient to receive the ordinary forks of lifts in common use for picking up individual or multiple pallet loads in movement and transportation from one position to another, as with other pallet structures now in use.

It will be understood that the thickness of the material employed in each of the clamps will be governed by the intended use of the pallet and this will also be true of the thickness and structure of the members 13 and 14 employed.

In the diagrammatic illustration of FIG. 2 of the drawing, the load on the lower pallet is illustrated in dot-dash lines at 22 and part of the load on the upper pallet is diagrammatically illustrated in dot-dash lines at 22'. This load may constitute a single product or container or may comprise several products or containers arranged side by side and one upon the other, as is customary in the use of pallets of known construction.

Having fully described my invention, what I claim as new and desire to secure by Letters Patent is:

1. A knockdown pallet structure of the character defined comprising two body members of predetermined contour, two pairs of channelled clamps mounted on opposed edge portions adjacent ends of said body members with the clamps in each pair in common alinement, said clamps supporting the body members in spaced relationship to each other and the positioning of the clamps on said body members maintaining the major portion of the periphery of the body members accessible for reception of pickup hooks, ropes and cables, each of said clamps comprising a pair of channels frictionally receiving an engaging edge portions of said body members, each clamp including, centrally thereof, a channel opening outwardly with respect to edge portions of said members, said channel being defined by a crosshead spacing said body members one from the other, and substantially parallel side walls forming one side wall of each of said first named channels.

2. A pallet structure as defined in claim 1, wherein the first named channels include other side walls shorter in length and generally parallel to the side walls of the central channel.

3. A pallet structure as defined in claim 1, wherein the side walls of the central channel include tangs extending into the first named channels to engage the members mounted in said channels in retaining the clamps against displacement from said members.

References Cited by the Examiner

UNITED STATES PATENTS

| 2,152,086 | 3/1939 | Powell | 108—57 |
| 2,311,280 | 2/1943 | Quayle | 108—57 |
| 2,491,073 | 12/1949 | Barrett | 108—57 |
| 2,640,669 | 6/1953 | Ashford | 108—56 |
| 2,933,339 | 4/1960 | Alvden | 108—58 X |
| 3,149,586 | 9/1964 | Kemp et al. | 108—58 |

FOREIGN PATENTS

| 1,087,089 | 2/1955 | France. |
| 81,301 | 4/1956 | Netherlands. |

FRANK B. SHERRY, *Primary Examiner.*

G. O. FINCH, *Assistant Examiner.*